No. 709,438. Patented Sept. 16, 1902.
G. M. FILLMORE.
FEED BOX FOR LIVE STOCK.
(Application filed Jan. 17, 1902.)
(No Model.) 2 Sheets—Sheet 1.
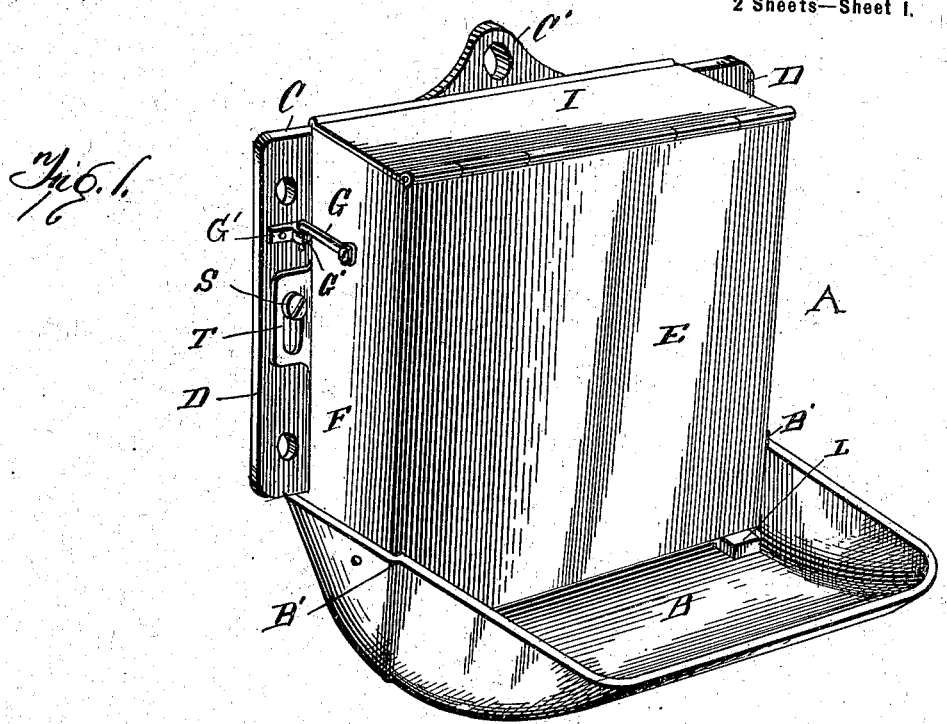
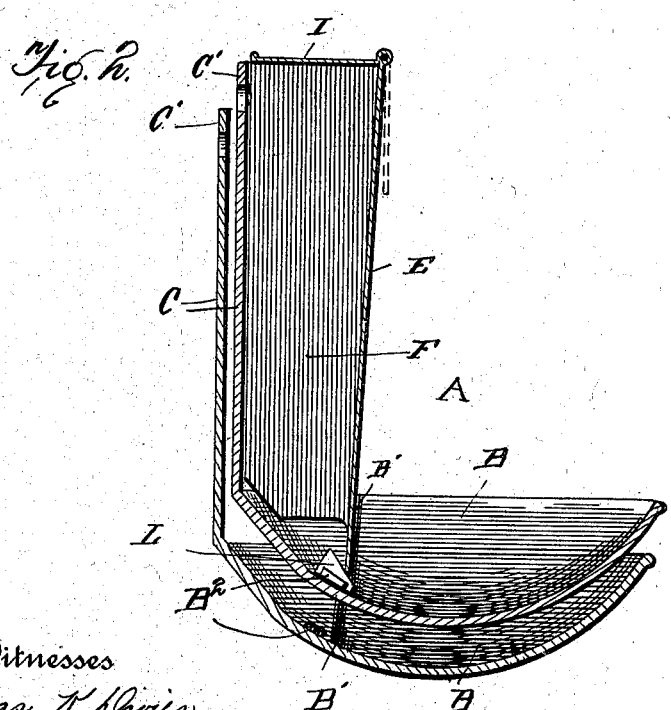

No. 709,438. Patented Sept. 16, 1902.
G. M. FILLMORE.
FEED BOX FOR LIVE STOCK.
(Application filed Jan. 17, 1902.)
(No Model.) 2 Sheets—Sheet 2.
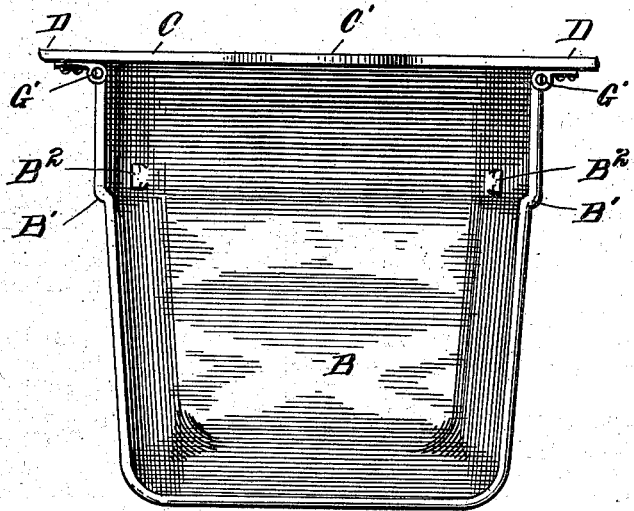
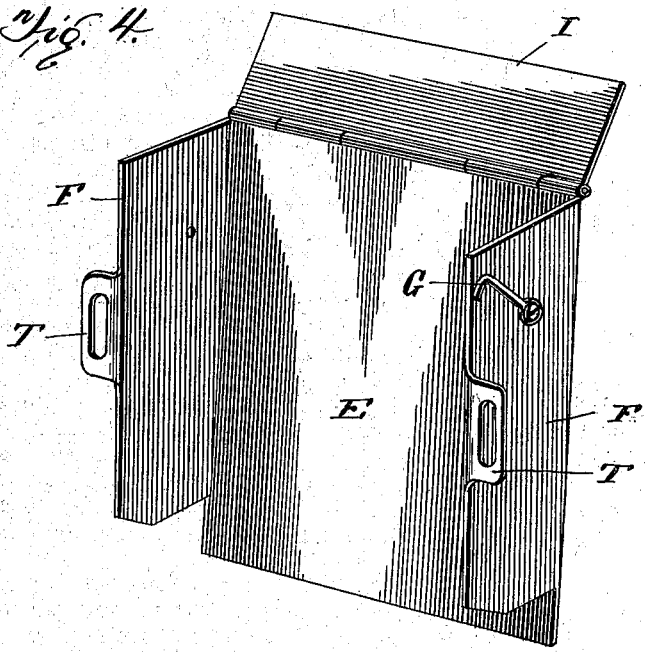
Witnesses
Chas. K. Davies.
M. H. Ramage
Inventor
G. M. Fillmore
By W. H. Bartlett
Attorney
THE NORRIS PETERS CO., PHOTO-LITHO., WASHINGTON, D. C.

UNITED STATES PATENT OFFICE.

GEORGE M. FILLMORE, OF WASHINGTON, DISTRICT OF COLUMBIA, ASSIGNOR, BY DIRECT AND MESNE ASSIGNMENTS, OF TWO-THIRDS TO JACKSON H. RALSTON, OF HYATTSVILLE, MARYLAND, AND M. H. RAMAGE AND ALBERT SCHULTEIS, OF WASHINGTON, DISTRICT OF COLUMBIA.

FEED-BOX FOR LIVE STOCK.

SPECIFICATION forming part of Letters Patent No. 709,438, dated September 16, 1902.

Application filed January 17, 1902. Serial No. 90,109. (No model.)

*To all whom it may concern:*

Be it known that I, GEORGE M. FILLMORE, residing at Washington, District of Columbia, have invented certain new and useful Improvements in Feed-Boxes for Live Stock, of which the following is a specification, reference being had therein to the accompanying drawings.

This invention relates to feed-boxes for granivorous animals, especially for horses.

The object of the invention is to produce a feed-box from which grain or feed will be delivered but slowly to the animal, so that there will be little or no waste of feed by giving the animal access to a large quantity of feed, which he might nose about and waste, and to compel the animal to eat slowly, thus preventing indigestion.

The improvement consists in certain constructions and combinations of mechanism, as hereinafter described and claimed; also, to simplify and cheapen the cost of construction of feed-boxes of the character stated and to adapt them for use and for shipment at minimum of cost and of labor.

Figure 1 is a perspective view of a feed-box involving my improvements. Fig. 2 is a vertical central section through one feed-box, showing also the bowl of another to show the relations of the bowls in nesting for shipment. Fig. 3 is a top plan of the bowl or body of the box. Fig. 4 is a perspective view of the piece forming the hopper front and cover.

It is a matter of experience that where grain is fed to a horse in small quantities, so that the animal cannot at once get a complete mouthful, the animal will keep his nose in the trough and lick up the grain doled out to him and will not so often swing his head, even if flies are troublesome. If he does swing his head to drive away a fly, not having much grain in his mouth he can waste but little. By thorough test of hopper-boxes of this character it has been found that a horse will keep in good condition with from ten to twenty per cent. less grain if fed sparingly, as from a hopper. The box into which the hopper feeds need not be much larger than the nose of the animal, as the horse will keep his mouth close to the hopper and lick up the feed as it comes down. As the feed is in such case more thoroughly masticated, the animal remains in better health.

The box A of this invention has a shallow trough B, with inclined front, rear, and sides. The back side slants upward from the back of the trough and then extends upward as a flat back plate C. The sides of this back plate C form wings D, through which holes for screws or other attaching devices are formed. An extension-lug C' at the top of plate C may have a hole for a holding screw or nail. The trough and back are preferably of metal, either of cast metal or sheet metal, struck up or otherwise formed to shape. That part of the trough toward the front into which the animal reaches with his nose for feed is preferably a little narrower than the rear part, thus forming shoulders B' B'. The funnel or hopper is formed by the back plate C and by the hopper-piece, which consists of a plate E, having side wings or flanges F F. The plate E forms the front and the flanges F F form the ends of the hopper, plate C forming the back thereof.

It is desirable that the front and ends of the hopper be removable for shipment and for cleaning, and a large number of the troughs may be "nested" together when the hopper part is removed. It is desirable that the delivery-opening of the hopper be adjustable. The hopper or box sections may also be nested together.

The part E F is preferably of sheet metal bent to shape. When applied as in Figs. 1 and 2 to the trough-section, the lower part of the plate E extends nearly to the bottom of trough B and near to the inclined portion of rear plate C, thus leaving a narrow opening below plate E. The shoulders B' will hold the bottom of plate E, and the wings or flanges F, extending against the back plate C, complete the inclosing sides of the box. Hooks G, attached to the wings of the hopper-front, may engage eyes G' on the trough-back, thus holding the hopper-front securely in place. In addition to hooks G the hopper-front may be held in place by set-screws S, passing through slots in lugs T, turned out from the edge of the sides F.

A cover I is hinged to the box, preferably at the front upper corner of plate E. This cover when turned down to close the hopper, as in Fig. 1, can hardly be lifted by the animal, but can readily be opened for charging the box.

The box or hopper E can be adjusted to various heights, so as to allow a greater or less opening under plate E and between the same and the inclined part B' of the trough-bottom for the feed of grain downward and forward by gravity. The set-screws T afford an efficient means for holding the front of the hopper at such height as to regulate the feed-opening. An additional support may be used, such as a pair of small wedges L, inside the hopper and having their narrow ends extending under plate E. These can be retained in place by lugs B² on the box-bottom. A pair of wooden wedges can be formed by almost any farmer in a few moments and need not be shipped with the trough and hopper unless desired. Other means for adjusting the hopper-front will suggest themselves to the skilled mechanic.

The hooks G being attached to wings F lie close to the same and can be brought into engagement with eyes G' to hold the hopper-sections firmly together, but will permit sufficient adjustment of the parts to secure the desired rapidity of feed from the hopper to trough B.

Cover I may be locked in any usual or convenient way, if desirable.

The wings F are inclosed by the sides of the trough sufficiently to make a joint close enough to prevent the leakage of grain.

The hopper front and sides can be removed for cleaning, &c., and the feed-bowl can then be used as an ordinary feed-box.

The size of box B is preferably such as to contain an ordinary feed for a horse—say four, six, or eight quarts. The hopper-front and flanges should preferably be made of such size as to form a receptacle which will be a measure of known capacity—say one peck.

As will be understood from the foregoing, my feed-box is capable of modification without departing from the spirit of my invention.

Thus the hopper might be adjusted by the set-screws alone or the wedges alone; but with both devices a firmer fastening may be made, although I do not limit my claims to either.

What I claim is—

1. In a feed-box, the combination of a metallic bowl having an inclined rear side, extending upward as a vertical back plate and provided with suspending devices, and a section forming a hopper front and sides, and adjustably and removably connected to the flat vertical back plate so as to form a receptacle between said hopper-section and the extended back of the bowl, substantially as described.

2. In a feed-box, the combination of a bowl having an upward extension at one side, an adjustable and removable hopper-section having front and ends, and means for securing the hopper-section in adjusted relation to the bowl, so that the opening under the hopper into the bowl may be of the desired capacity.

3. The combination with the bowl having an extended back plate, of the hopper-section removably secured thereto, and means for adjusting and securing the hopper-section vertically on said back plate.

4. The combination of the metallic bowl having upwardly-extended back plate, of the hopper-section having front and side flanges and slotted attaching-lugs, and set-screws extending through the slots in said lugs into the back plate.

5. The combination of a metallic bowl having a widened rear portion and a back plate, of a removable hopper-section fitting into the widened rear portion of the bowl, and attaching devices by which the hopper-section is attached to the back plate.

6. In a feed-box, the combination of a cast-metal bowl having an extension back piece provided with suspending devices and a sheet-metal hopper-section having a front and sides, and slotted outturned lugs which rest against said back, said hopper and back being secured in adjusted relation, substantially as described.

In testimony whereof I affix my signature in presence of two witnesses.

GEORGE M. FILLMORE.

Witnesses:
W. A. BARTLETT,
M. E. BROWN.